US012602877B2

(12) United States Patent
Bai et al.

(10) Patent No.: US 12,602,877 B2
(45) Date of Patent: Apr. 14, 2026

(54) BODY MODEL PROCESSING METHODS AND APPARATUSES, ELECTRONIC DEVICES AND STORAGE MEDIA

(71) Applicants: Beijing BOE Health Technology Co., Ltd., Beijing (CN); BOE Technology Group Co., Ltd., Beijing (CN)

(72) Inventors: Guang Bai, Beijing (CN); Limin Yang, Beijing (CN); Hua Bai, Beijing (CN); Jinan Li, Beijing (CN); Hao Li, Beijing (CN); Kaiyu Li, Beijing (CN); Baoqing Wang, Beijing (CN)

(73) Assignees: Beijing BOE Health Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 171 days.

(21) Appl. No.: 18/580,144

(22) PCT Filed: Sep. 21, 2022

(86) PCT No.: PCT/CN2022/120085
§ 371 (c)(1),
(2) Date: Jan. 17, 2024

(87) PCT Pub. No.: WO2023/124280
PCT Pub. Date: Jul. 6, 2023

(65) Prior Publication Data
US 2025/0037381 A1     Jan. 30, 2025

(30) Foreign Application Priority Data
Dec. 30, 2021    (CN) .......................... 202111651410.9

(51) Int. Cl.
G06T 19/00          (2011.01)
G06F 3/0481         (2022.01)
G06T 19/20          (2011.01)

(52) U.S. Cl.
CPC ............ *G06T 19/00* (2013.01); *G06F 3/0481* (2013.01); *G06T 19/20* (2013.01); *G06T 2200/24* (2013.01)

(58) Field of Classification Search
CPC ................ G06T 19/00; G06T 2200/24; G06T 2219/2021; G06T 13/40; G06T 19/20;
(Continued)

(56) References Cited

U.S. PATENT DOCUMENTS

2012/0162218 A1      6/2012   Kim et al.
2018/0374251 A1*    12/2018   Mitchell ................. G06T 19/20
(Continued)

FOREIGN PATENT DOCUMENTS

CN          109829971 A      5/2019
CN          111460788 A      7/2020
(Continued)

OTHER PUBLICATIONS

"Character Creator 3 Online Manual", Reallusion.com, Mar. 2021, manual.reallusion.com/Character_Creator_3/ENU/3/Content/Character_Creator_3/3.3/01_Welcome/Welcome.htm. (see website and NPL attached snapshot of section headers). Accessed Aug. 28, 2025. (Year: 2021).*
(Continued)

*Primary Examiner* — Alicia M Harrington
*Assistant Examiner* — Christine Yera Ahn
(74) *Attorney, Agent, or Firm* — IPro, PLLC

(57) ABSTRACT

The body model processing method includes: in response to detecting a trigger operation for a currently-displayed body model, displaying a parameter configuration window; where the parameter configuration window includes an image component relating to at least one model parameter of the body model; in response to detecting a trigger operation for at least one image component, determining a model param-
(Continued)

In response to detecting a trigger operation for a body model displayed currently, display a parameter configuration window, where the parameter configuration window includes an image component relating to at least one model parameter of the body model ~11

In response to detecting a trigger operation for at least one image component, determine a model parameter corresponding to the at least one image component and obtain a target body model corresponding to the model parameter ~12

Display the target body model corresponding to the model parameter ~13 eter corresponding to the at least one image component and obtaining a target body model corresponding to the model parameter; displaying the target body model corresponding to the model parameter.

7 Claims, 3 Drawing Sheets

(58) Field of Classification Search
CPC . G06F 3/0481; G06F 3/04842; G06F 3/04847
See application file for complete search history.

(56) References Cited

U.S. PATENT DOCUMENTS

| | | | | |
|---|---|---|---|---|
| 2020/0126295 | A1* | 4/2020 | Mok | G06V 20/64 |
| 2021/0097759 | A1 | 4/2021 | Agrawal et al. | |
| 2022/0058848 | A1* | 2/2022 | Peng | G06T 13/40 |
| 2022/0270387 | A1 | 8/2022 | Bai et al. | |

FOREIGN PATENT DOCUMENTS

| | | | |
|---|---|---|---|
| CN | 112837426 | A | 5/2021 |
| CN | 112837427 | A | 5/2021 |
| CN | 113345069 | A | 9/2021 |
| CN | 113643789 | A | 11/2021 |
| CN | 114327168 | A | 4/2022 |

OTHER PUBLICATIONS

PCT/CN2022/120085 international search report dated Dec. 5, 2022.
PCT/CN2022/120085 Written Opinion dated Dec. 5, 2022.
Anonymous. "OpenGL10-Principles of Skeletal Animation(2)." retrieved from https://www.cnblogs.com/zhanglitong/p/3201972. html. 10 pages.
Anonymous. "Principles of Skeletal Animation-Detailed explanation of animation related theories." retrieved from https://www.cnblogs.com/tandier/p/10087656.html. 18 pages.
Anonymous. "Tutorial 9: Skeletal Animation". retrieved from https://research.ncl.ac.uk/game/mastersdegree/ graphicsforgames/ skeletalanimation/. 13 pages.
Anonymous. "Principles of Skeletal Animation-Game animation development trend." retrieved from https://github.com/Maoxie/Notes/blob/master/docs/ABC/%E5%9B%BE%E5%BD%A2%E5%AD%A6/%E9%AA%A8%E9%AA%BC%E5%8A%A8%E7%94%BB%E5%8E%9F%E7%90%86.md. 28 pages.
Anonymous. "Introduction to Skeletal Animation Principles." 9 pages.

\* cited by examiner

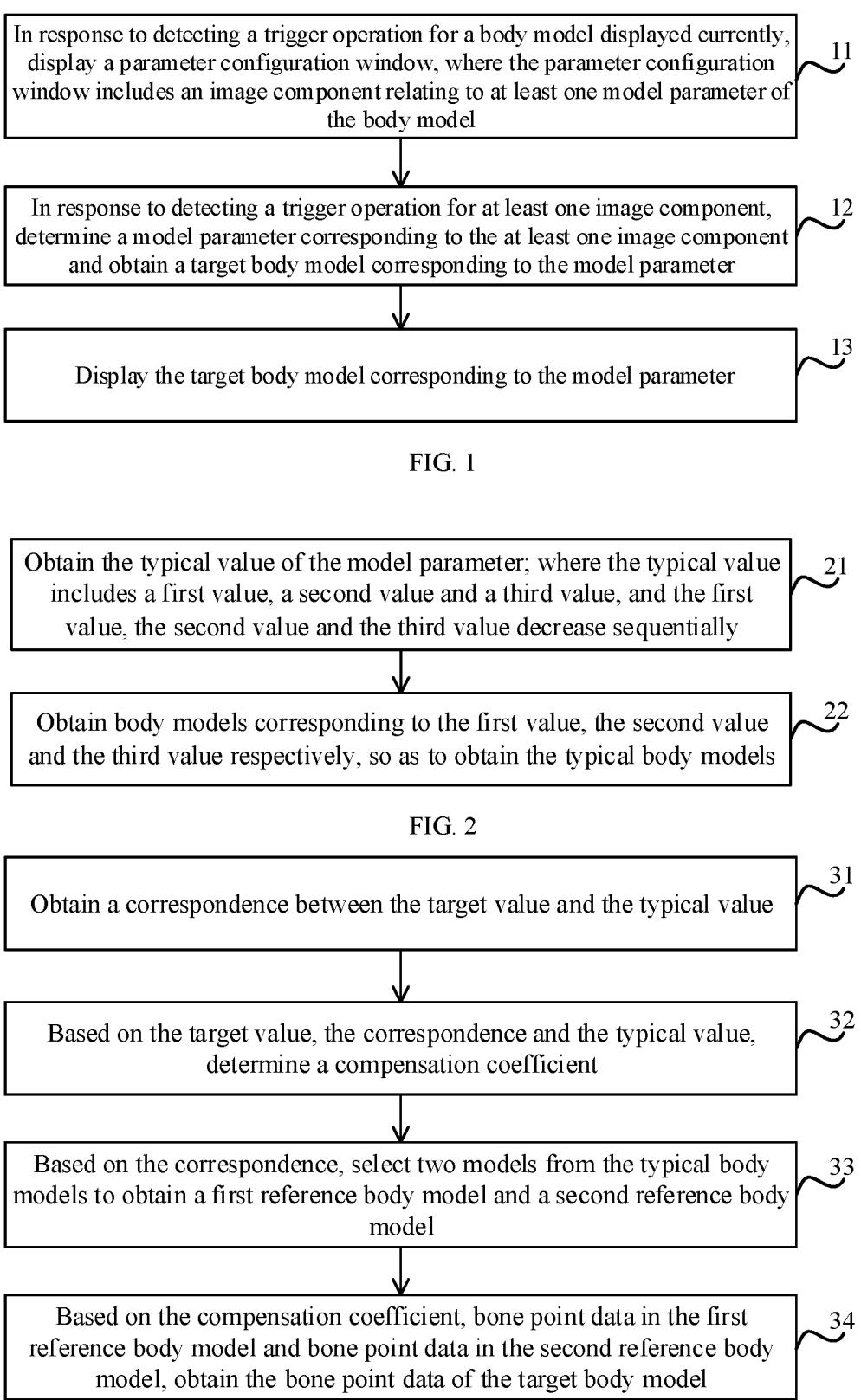

In response to detecting a trigger operation for a body model displayed currently, display a parameter configuration window, where the parameter configuration window includes an image component relating to at least one model parameter of the body model ⎦~11

In response to detecting a trigger operation for at least one image component, determine a model parameter corresponding to the at least one image component and obtain a target body model corresponding to the model parameter ⎦~12

Display the target body model corresponding to the model parameter ⎦~13

FIG. 1

Obtain the typical value of the model parameter; where the typical value includes a first value, a second value and a third value, and the first value, the second value and the third value decrease sequentially ⎦~21

Obtain body models corresponding to the first value, the second value and the third value respectively, so as to obtain the typical body models ⎦~22

FIG. 2

Obtain a correspondence between the target value and the typical value ⎦~31

Based on the target value, the correspondence and the typical value, determine a compensation coefficient ⎦~32

Based on the correspondence, select two models from the typical body models to obtain a first reference body model and a second reference body model ⎦~33

Based on the compensation coefficient, bone point data in the first reference body model and bone point data in the second reference body model, obtain the bone point data of the target body model ⎦~34

FIG. 3

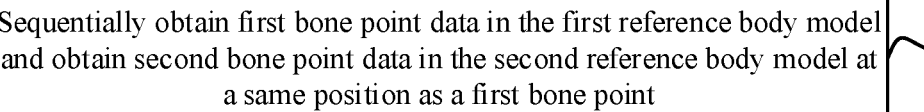

Sequentially obtain first bone point data in the first reference body model and obtain second bone point data in the second reference body model at a same position as a first bone point                    41

Based on the compensation coefficient, the first bone point data and the second bone point data, perform interpolation to obtain newly-interpolated bone point data and take the newly-interpolated bone point data as bone point data in the target body model at a same position as the first bone point                    42

BODY MODEL PROCESSING METHODS AND APPARATUSES, ELECTRONIC DEVICES AND STORAGE MEDIA

CROSS-REFERENCE TO RELATED APPLICATIONS

This application is a national stage of international PCT Application No. PCT/CN2022/120085 filed on Sep. 21, 2022, which claims priority to Chinese patent application No. 202111651410.9 filed on Dec. 30, 2021, the entire contents of which are incorporated herein by reference.

TECHNICAL FIELD

The present disclosure relates to the field of data processing technologies and in particular to a body model processing method and apparatus, an electronic device and a storage medium.

BACKGROUND

Along with more and more application scenarios of body models, users may need to adjust parameters such as a body height or body weight of the body models, so as to obtain different body models. In the related arts, the existing model softwares support the users to adjust some parameters of the body models to form static body models, thus helping the users to observe and use the body models.

However, in the related arts, generation of only static body models is supported, such that the display effect of the body models is relatively stiff, leading to lack of vividness and low experiences.

SUMMARY

The present disclosure provides a body model processing method and apparatus, an electronic device and a storage medium so as to solve the defects of the prior arts.

According to a first aspect of embodiments of the present disclosure, there is provided a body model processing method, which includes: in response to detecting a trigger operation for a body model displayed currently, displaying a parameter configuration window; where the parameter configuration window includes an image component relating to at least one model parameter of the body model; in response to detecting a trigger operation for at least one image component, determining a model parameter corresponding to the at least one image component and obtaining a target body model corresponding to the model parameter; displaying the target body model corresponding to the model parameter.

In some embodiments, obtaining the target body model corresponding to the model parameter includes: obtaining a target value of the model parameter; obtaining typical body models corresponding to a typical value of the model parameter; based on the target value, processing the typical body models to obtain the target body model corresponding to the model parameter.

In some embodiments, obtaining the typical body models corresponding to the typical value of the model parameter includes: obtaining the typical value of the model parameter; where the typical value includes a first value, a second value and a third value, and the first value, the second value and the third value decrease sequentially; obtaining body models corresponding to the first value, the second value and the third value respectively, so as to obtain the typical body models.

In some embodiments, based on the target value, processing the typical body models includes: based on the target value, processing bone point data in the typical body models to obtain bone point data of the target body model.

In some embodiments, based on the target value, processing the typical body models includes: based on a preset bone point hierarchical sequence and the target value, processing the bone point data in the typical body models to obtain the bone point data of the target body model.

In some embodiments, processing the bone point data in the typical body models includes: obtaining a correspondence between the target value and the typical value; based on the target value, the correspondence and the typical value, determining a compensation coefficient; based on the correspondence, selecting two models from the typical body models to obtain a first reference body model and a second reference body model; based on the compensation coefficient, the bone point data in the first reference body model and the bone point data in the second reference body model, obtaining the bone point data of the target body model.

In some embodiments, based on the compensation coefficient, the bone point data in the first reference body model and the bone point data in the second reference body model, obtaining the bone point data of the target body model includes: sequentially obtaining first bone point data in the first reference body model and obtaining second bone point data in the second reference body model at a same position as a first bone point; based on the compensation coefficient, the first bone point data and the second bone point data, performing interpolation to obtain newly-interpolated bone point data and taking the newly-interpolated bone point data as bone point data in the target body model at a same position as the first bone point.

In some embodiments, the bone point data of the target body model is calculated in a following formula:

$$Gp = Gm * \beta + Gn * (1 - \beta);$$

where Gp represents the newly-interpolated bone point data. Gm represents the first bone point data, Gn represents the second bone point data, and β represents the compensation coefficient.

In some embodiments, based on the target value, processing the typical body models further includes: based on the target value, processing skin points in the typical body models; where the skin points are processed in a same manner as bone points.

According to a second aspect of embodiments of the present disclosure, there is provided a body model processing apparatus, which is applied to the method as mentioned above. The apparatus includes: a configuration window displaying module, configured to, in response to detecting a trigger operation for a body model displayed currently, display a parameter configuration window; where the parameter configuration window includes an image component relating to at least one model parameter of the body model; a body model obtaining module, configured to, in response to detecting a trigger operation for at least one image component, determine a model parameter corresponding to the at least one image component and obtain a target body model corresponding to the model parameter; a target model displaying module, configured to display the target body model corresponding to the model parameter.

According to a third aspect of embodiments of the present disclosure, there is provided a body model processing system, which includes: an inputting unit, configured to receive a target value of a model parameter input by a user; a processor, electrically connected with the inputting unit to generate a target body model corresponding to the model parameter by the above method; a displaying unit, electrically connected with the processor to display the target body model.

According to a fourth aspect of embodiments of the present disclosure, there is provided a computer readable storage medium, where executable computer programs in the storage medium are executed by a processor to perform the above method.

According to a fourth aspect of embodiments of the present disclosure, there is provided a computer readable storage medium, where executable computer programs in the storage medium are executed by a processor to perform the above method of any one item of the above first aspect.

The technical solutions provided by the embodiments of the present disclosure have the following beneficial effects: it can be known from the above embodiments that, in the solutions provided by the present disclosure, a parameter configuration window may be displayed in response to detecting a trigger operation for the currently-displayed body model, where the parameter configuration window includes an image component relating to at least one model parameter of the body model; then, in response to detecting a trigger operation for at least one image component, a model parameter corresponding to the at least one image component is determined and a body model corresponding to the model parameter is obtained: then, a target body model corresponding to the model parameter is displayed. Therefore, in the embodiments, the target body model can be better matched with the model parameter, which facilitates increasing the display effect during subsequent dynamic display and improving the use experiences.

It should be understood that the above general descriptions and subsequent detailed descriptions are merely illustrative and explanatory rather than limiting of the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

FIG. 1 is a flowchart illustrating a body model processing method according to an exemplary embodiment of the present disclosure.

FIG. 2 is a flowchart of obtaining a typical body model according to an exemplary embodiment of the present disclosure.

FIG. 3 is a flowchart of obtaining bone point data of a target body model according to an exemplary embodiment of the present disclosure.

FIG. 4 is another flowchart of obtaining bone point data of a target body model according to an exemplary embodiment of the present disclosure.

FIG. 5 is an effect diagram of obtaining a target body model according to an exemplary embodiment of the present disclosure.

4

Figure 6:
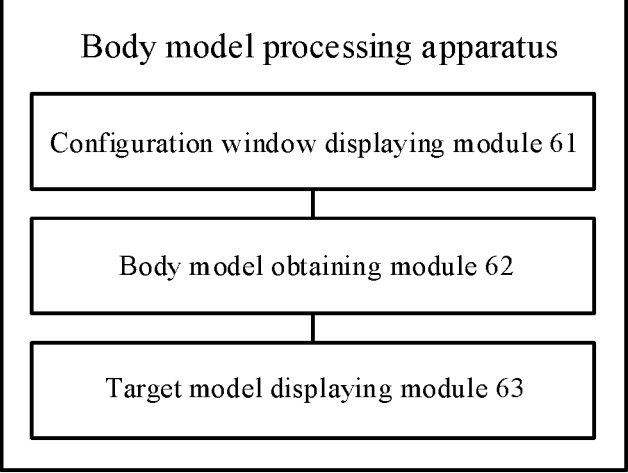

FIG. 6 is a block diagram illustrating a body model processing apparatus according to an exemplary embodiment of the present disclosure.

Figure 7:
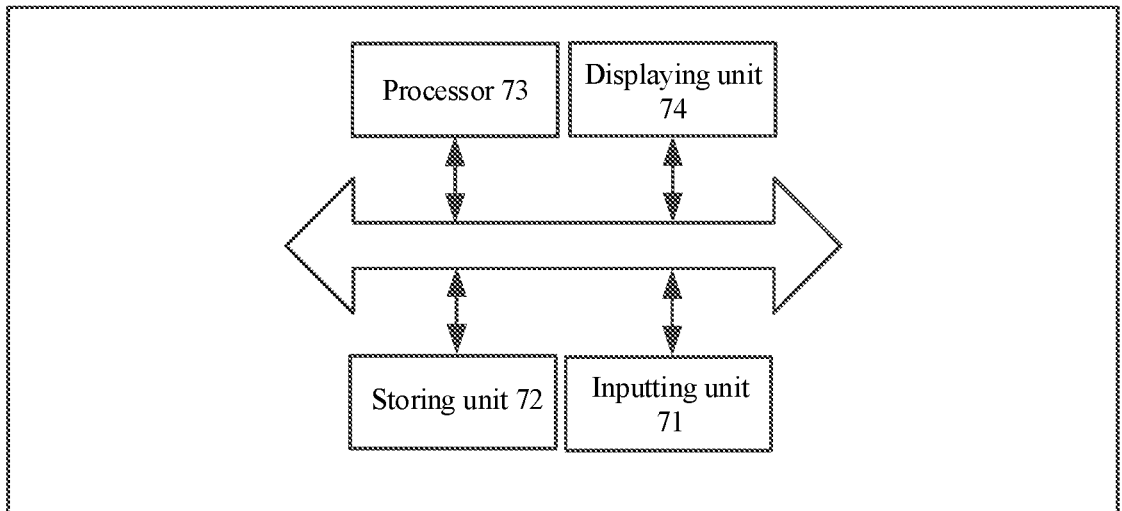

FIG. 7 is a block diagram illustrating a server according to an exemplary embodiment of the present disclosure.

DETAILED DESCRIPTION

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims. It is noted that, in case of no conflicts, the following embodiments and features in the embodiments can be mutually combined.

It is considered that in the related arts, the user is supported to adjust a body model to generate a static body model, which leads to a stiff and less vivid display effect of the body model. Through careful analysis, it is found that bones and skins of the body model are independent of each other in the related arts, and only the data of the skin points are adjusted to adjust a body shape of the body model to enable the body shape to match the model parameter. Since the bones and the skins are still in original binding relationship, the body model is not applicable to dynamic scenarios, lowering the use experiences.

To solve the above technical problems, an embodiment of the present disclosure provides a body model processing method. Its invention thought is as follows: the user is allowed to adjust the value of at least one model parameter of the currently-displayed model to obtain an adjusted body model applicable to dynamic display. i.e. the target body model, thereby improving the use experiences. The body model processing method provided by the embodiments of the present disclosure may be applied to a body model processing system. The body model processing system may be a separate terminal device or include a server, a cloud device and a terminal device, which is not limited herein. For example, when the body model processing system is a separate terminal device, the terminal device may complete the body model processing method. For example, when the body model processing system includes a front end and a server, the front end may serve as a device for display and interaction, and may display a body model. The server may perform data processing to obtain the bone point data and the skin point data of the body model, and the front end may use the bone point data and the skin point data to generate a target body model. The technicians may select the architecture of the body model processing system based on the specific scenario. As long as the computation resources and the real-timeness requirements are satisfied and the model parameter can be obtained and the target body model can be obtained and displayed, the corresponding solutions will fall within the scope of protection of the present disclosure. For ease of descriptions, the solutions of the embodiments are implemented with the body model processing system as an execution subject in the present disclosure.

FIG. 1 is a flowchart illustrating a body model processing method according to an exemplary embodiment of the present disclosure. As shown in FIG. 1, the body model processing method includes steps 11 to 13.

At step 11, in response to detecting a trigger operation for a body model displayed currently, a parameter configuration window is displayed, where the parameter configuration window includes an image component relating to at least one model parameter of the body model.

In this embodiment, the body model processing system may also store preset body models, which may have different features, for example, a short and fat model, a tall and fat model, a short and thin model etc. When detecting an operation of a user for selecting one of the preset body models, the body model processing system may display the selected preset body model. In practical applications, the body model processing system may also generate and display a body model based on input data of the user. The above input data may include but not limited to model parameter, storage format, storage position or the like, which can be set based on specific scenario. The model parameter may include but not limited to age, body height, body weight, head circumference, shoulder width, chest circumference, waist circumference, hip circumference or the like, which can be set based on specific scenario. The above corresponding solutions shall fall within the scope of protection of the present disclosure.

In this embodiment, when a body model is displayed, the user may adjust an orientation of the body model to observe whether some model parameters (e.g. body height, body weight, chest circumference, waist circumference or the like) of the displayed body model are satisfactory. When one or more parameters of the body model are not satisfactory, the above parameters may be adjusted separately.

In this embodiment, in a display process of a body model, when it is required to adjust a parameter of the body model, the user may trigger (e.g. single click or double click) the body model and at this time, the body model processing system may display an interactive interface. The user may continue triggering based on the contents of the interactive interface, so that a parameter configuration window is displayed in the interactive interface. The parameter configuration window includes an image component relating to at least one model parameter of the body model. The image component may include but not limited to a scroll bar, a button for increasing parameter value, a button for decreasing parameter value, or an input field for model parameter value. Certainly, when the body model processing system does not display a body model, the user still can find out the interactive interface, and then the parameter configuration window can be displayed in the interactive interface.

At step 12, in response to detecting a trigger operation for at least one image component, a model parameter corresponding to the at least one image component is determined and a target body model corresponding to the model parameter is obtained.

In this embodiment, when the parameter configuration window is displayed, the user may input the value of the model parameter based on the characteristics of the image component. With the image component as a scroll bar, the user may drag the scroll bar to a desired position, and the body model processing system may, based on a target position, determine a desired value of the model parameter and display it at a corresponding position of the image component. If the desired value is not satisfactory, the user may continue dragging the scroll bar and adjusting it to the target position, and thus the body model processing system may obtain a target value of the model parameter when the scroll bar is at the target position. With the image component as the input field for model parameter value, the user may single-click the above input field to enable the body model processing system to display a keyboard component in the parameter configuration window. The body model processing system may detect a trigger operation of the user for the keyboard component and determine a value corresponding to each key so as to obtain the target value of the model parameter. For example, the model parameter may be a body weight with the target value being 70 KG. In other words, the body model processing system, after detecting a trigger operation for at least one image component, determines a model parameter corresponding to the at least one image component and the value. i.e. the target value, of the model parameter.

It should be noted that the user may also adjust a plurality of model parameters, and at this time, the body model processing system may select a first model parameter and execute the body model processing method of the present disclosure to obtain a first body model; the body model processing system may also select a second model parameter and adjust the second model parameter based on the value of the model parameter of the first body model and then execute the body model processing method again to obtain a second body model and so on, until all model parameters are processed, and then a final target body model is obtained, and then the target body model is displayed.

In this embodiment, the body model processing system may obtain the target body model corresponding to the model parameter, which includes: obtaining, by the body model processing system, the target value of the model parameter, and obtaining typical body models corresponding to a typical value of the above model parameter, and then, based on the target value, processing the typical body models and then, obtaining the target body model corresponding to the model parameter.

For the obtaining of the typical body models corresponding to the typical value of the above model parameter, as shown in FIG. 2, in step 21, the body model processing system, after obtaining the target value of the model parameter, determines a model parameter to be modified by the user, and obtains the typical value of the model parameter, where the typical value may include a first value, a second value and a third value, and all of which decrease sequentially. In an example, a range of the first value is a first preset range which may include a maximum value of the model parameter; a range of the second value is a second preset range which may include a standard value of the model parameter, where the standard value may be obtained based on big data statistics; and a range of the third value is a third preset range, which may include a minimum value of the model parameter. With the model parameter as body weight, the first preset range of the body weight may be [90, 100] Kg with the maximum value being 100 KG; the third preset range of the body weight may be [40, 70] Kg, with the minimum value being 40 KG; and the second preset range of the body weight may be (70, 90) KG with the standard value being 80 KG. The technicians may set the value range based on the model parameter and the corresponding solution will fall within the scope of protection of the present disclosure.

In this embodiment, with continuous reference to FIG. 2, in step 22, the body model processing system obtains body models corresponding to the first value, the second value and the third value respectively from a pre-stored typical body model library, so as to obtain the typical body models. It can be understood that the typical body models corresponding to the first value, the second value and the third value differ only in the value of the above model parameter, with the values of other model parameters being same, and in this way, the influence of different typical values of the model parameter on the body model can be reflected.

In an embodiment, only the three-dimensional information of the skin points of the typical body models in the typical body model library is stored and general information of the typical body models is stored only once, and thus, during use, they can be directly read. Therefore, the processing steps such as extraction and retention steps of fixed information of a large number of typical body models are saved, the computation amount of subsequent steps is reduced and a storage space for storing a large number of typical body models is saved. The manner of obtaining the three-dimensional information of the skin points of the typical body models includes: for each of the body models, based on principal component analysis, determining a principal deformation component of the body model and a deformation feature value corresponding to the principal deformation component, where the principal deformation component is a component capable of causing partial morphological change of the body model. The typical body models are determined based on the principal deformation components and the deformation feature values.

In an embodiment, at least one typical model parameter of the body model is determined based on the principal deformation component and the deformation feature value, and based on each of the at least one typical model parameter determined, one typical body model is determined as a typical body model for reflecting deformation feature. Determining at least one typical model parameter of the body model based on the principal deformation component and the deformation feature value may include: based on the principal deformation component and the deformation feature value, adjusting a body parameter of a basic body model to obtain at least one typical model parameter. The basic body model may be a three-dimensional body model generated based on an average value of actual body parameters of a plurality of users, or a three-dimensional body model generated based on a parameter value set based on other requirements.

In another embodiment, based on the principal deformation component and the deformation feature value, three-dimensional skin point information of the basic body model may be directly adjusted to obtain a corresponding typical body model.

In an embodiment, since the body parameter and the three-dimensional skin point information of the body model are in an association relationship, the determination of the typical model parameter and the determination of the typical body model may be performed without sequence, and the typical body model may be determined without depending on the typical model parameter or determined by directly adjusting the three-dimensional skin point information. Therefore, in an embodiment, based on the principal deformation component and the deformation feature value, the body parameter and the three-dimensional skin point information of the basic body model may be adjusted synchronously so as to obtain the typical model parameter and the typical body model corresponding to the typical model parameter.

The principle of the above process will be described below in combination with a specific example.

It is assumed that there are a total of m true body models as samples of the principal component analysis, and each true body model contains n curved surface skin points as reference mark points. In the process of the principal component analysis, each true body model is represented by a column vector of a coordinate set of n curve surface skin points:

$$X_i = [x_1^i, y_1^i, z_1^i, x_2^i, y_2^i, z_2^i, \ldots \ldots, x_n^i, y_n^i, z_n^i]^T. \tag{1}$$

In the formula (1), i represents a sample serial number, i.e. a serial number of the true body models as samples in the present disclosure.

Then, by the formula (2), an average shape vector of all samples is calculated (as body parameter vector of the basic body model):

$$\bar{X} = \frac{1}{m} \sum_{i=1}^{m} X_i. \tag{2}$$

Furthermore, a covariance matrix of each sample is calculated in the following formula (3):

$$S = \frac{1}{m-1} \sum_{i=1}^{m} (X_i - \bar{X})^T \cdot (X_i - \bar{X}). \tag{3}$$

Furthermore, by Singular Value Decomposition (SVD), the principal deformation components (feature vector) $\phi_m$ and the corresponding deformation feature values $\lambda_m$ of the covariance matrix S are calculated. The principal deformation components (feature vector) $\phi_m$ and the corresponding deformation feature values $\lambda_m$ can largely retain the main data information of m raw samples to reflect the deformation features of the m raw samples, while irrelevant or repetitive data information is deleted to reduce computation amount.

All of the calculated deformation feature values are sorted in a descending order, and the first c largest deformation feature values $\lambda_m$ are taken as estimation for entirely all shapes of the samples, where each body shape can be represented as follows:

$$X = \bar{X} + \sum_{i=1}^{c} b_m \phi_m. \tag{4}$$

In the formula (4), $b_m$ represents a shape coefficient which can be regarded as compression representation for the sample shape, and other parameters have the same meaning as above.

By adjusting the shape coefficient $b_m$, adjustment to $\bar{X}$ can be achieved: based on the deformation feature value $\lambda_m$, the value of the shape coefficient $b_m$ can be determined and then substituted into the formula (4) to determine one typical body model X. The correspondence between the deformation feature value $\lambda_m$ and the shape coefficient $b_m$ can be set based on actual requirements or empirical value. For example, $b_m = \pm 3\sqrt{\lambda_m}$, where 3 herein can be replaced with another value based on actual requirement.

In an embodiment, the body model processing system obtains and stores the typical body models, which includes: converting a file of the typical body models into a binary file for storage, where the binary file of the typical body models includes the typical model parameters of binary format.

In an example, the body model processing system can create a binary file, and thus convert the typical body models and its typical model parameters into binary format, and then write them into the binary file.

In another example, the body model processing system can write, layer by layer, model names of the typical body models of binary format, the number of the skin points of the typical model parameters of binary format, and three-dimensional positions of the skin points of the typical model parameters of binary format into the binary file.

In another example, the binary file is stored by using Unity scripts. Unity3D is a multi-platform comprehensive development tool which is developed by Unity Technologies to help a user to easily create various types of interaction contents such as three-dimensional video games, building visualization or real-time three-dimensional animation or the like. Therefore, Unity3D is a fully-integrated professional engine, which has the advantages of simple deployment, user friendliness, has scaled plugins and middleware to speed up development, supports C# language-based scripts, and can achieve a relative proper balance between good programming and running efficiency.

In the embodiments of the present disclosure, when a large number of typical body models are stored, the fixed information can be stored once because it is general information of the typical body models, and only the three-dimensional information of the skin points of these typical body models need to be stored. In this way, the processing steps such as extraction and retention steps of the fixed information of a large number of typical body models are saved, the computation amount of subsequent steps is reduced and a storage space for storing a large number of typical body models is saved.

In some embodiments, when the body model processing system is to obtain the target body model corresponding to the model parameter, the body model processing system may process the above typical body models based on the target value so as to obtain the target body model corresponding to the model parameter. In an example, the body model processing system may process the bone point data in the typical body models based on the above target value so as to obtain the bone point data of the target body model. In another example, since the bone points in the body models are hierarchical, the body model processing system may obtain a preset bone hierarchical sequence and based on the target value and the bone hierarchical sequence, process the bone point data in the typical body models so as to obtain the bone point data of the target body model. Thus, in this embodiment, by processing the bone point data in the typical body models, the bone point data matching the target body model can be obtained. Compared with the solution in the prior arts in which only the skins are adjusted for generation of the body model, the bones and the skins can be matched such that they can be still matched during a dynamic process of the target body model, thereby improving the display effect.

It should be noted that the bone hierarchy is preset in a body generation algorithm and used to represent a connection relationship between body bones. During specific implementation, the bone joints can be presented as hierarchical structure. i.e. tree structure, and thus, one skeleton has one root joint point and other joint points are child joint points of the root joint point or child joint points of the child joint points or child joint points of the child joint points of the child joint points and so on. Hence, one skeleton can be understood as a tree structure with tree nodes as coordinate system. Furthermore, transformation information stored in a child joint point can transform a vertex in a child joint space into a parent joint space. The root joint point stores transformation information for transformation from the root joint point to the body model space. In this embodiment, the above bone hierarchical sequence may be used to obtain the bone point data from a root node to a last leave node, so as to reduce data processing amount and increase the processing efficiency.

In an embodiment, the body model processing system may process the bone points in the typical body models, which includes steps 31 to 34 as shown in FIG. 3.

At step 31, the body model processing system obtains a correspondence between the target value and the typical value. With the typical value as the first value, the second value and the third value of the model parameter, the body model processing system may compare the target value with the second value to obtain a size relationship between the target value and the second value. When the above size relationship represents that the target value is greater than or equal to the second value, the body model processing system may determine that the target value is between the second value and the first value, that is, the correspondence represents that the target value is between the second value and the first value. When the above size relationship represents that the target value is less than the second value, the body model processing system may determine that the target value is between the second value and the third value, that is, the correspondence represents that the target value is between the second value and the third value.

With the typical value as the maximum value, the minimum value and the standard value of the model parameter, the body model processing system can compare the target value with the standard value to obtain a size relationship between the target value and the standard value. When the target value is greater than or equal to the standard value, the body model processing system may determine a correspondence for representing the target value is between the standard value and the maximum value. When the target value is less than the standard value, the body model processing system may determine a correspondence for representing the target value is between the standard value and the minimum value.

With continuous reference to FIG. 3, at step 32, the body model processing system determines a compensation coefficient based on the target value, the correspondence and the typical value. The body model processing system may, based on the correspondence, determine two typical values to be selected. For example, when the correspondence represents that the target value is between the second value and the third value, it is determined that the two to-be-selected typical values are the second value and the third value. For another example, when the correspondence represents that the target value is between the second value and the first value, it is determined that the two to-be-selected typical values are the first value and the second value. Then, the body model processing system may calculate the compensation coefficient based on the target value and the above two typical values.

When the typical value is the first value and the second value, the compensation coefficient can be calculated in the following formula:

$$\beta = (P-S)/(M-S). \tag{5}$$

When the typical value is the second value and the third value, the compensation coefficient can be calculated in the following formula:

$$\beta = (P-N)/(S-N). \tag{6}$$

In the formulas (5) and (6), $\beta$ represents the compensation coefficient, P represents the target value of the model parameter, M represents the first value, S represents the second value, and N represents the third value.

At step 33, the body model processing system selects two models from the typical body models based on the correspondence to obtain a first reference body model and a second reference body model. The body model processing system may, based on each typical value, generate one body model, that is, one body model corresponding to the first value, one body model corresponding to the second value, and one body model corresponding to the third value. Then, two models selected therefrom are referred to as the first reference body model and the second reference body model.

Since two typical values to be selected can be determined based on the correspondence between the target value and the typical value in step 32, the body model processing system may select the body models corresponding to the two typical values. With the model parameter as body weight, the body model corresponding to the first value is a fat body model, the second value corresponds to a standard body model, and the body model corresponding to the third value is a thin body model. When the correspondence represents that the target value is between the second value and the third value, the body model processing system may select the standard body model and the thin body model. When the correspondence represents that the target value is between the first value and the second value, the body model processing system may select the standard body model and the fat body model.

At the step 34, the body model processing system may, based on the compensation coefficient, the bone point data in the first reference body model and the bone point data in the second reference body model, obtain bone point data of the target body model. As shown in FIG. 4, at step 41, the body model processing system sequentially obtains first bone point data in the first reference body model and second bone point data in the second reference body model at the same position as a first bone point. At step 42, the body model processing system, based on the compensation coefficient, the first bone point data and the second bone point data, perform interpolation to obtain newly-interpolated bone point data and take the newly-interpolated bone point data as bone point data in the target body model at the same position as the first bone point. Thus, by interpolating a new bone point between the first bone point and the second bone point, the new bone point is enabled to match the compensation coefficient so as to finally obtain a bone point of a new model (i.e. the target body model) between the first reference body model and the second reference body model. If only one model parameter has difference values between the first reference body model and the second reference body model, the bone points of the obtained new model and the bone points of the two reference body models also differ in the change of the above model parameter, thus achieving the effect that the bone points change along with the model parameter.

In other words, in this step, the body model processing system may, based on the first bone point data in the first reference body model and the second bone point data at the same position in the second reference body model, generate bone point data at the same position in the target body model. The function relationship is Gp=f (Gm, Gn, $\beta$), where Gp refers to the bone point data in the target body model, Gm refers to the bone point data in the first reference body model, Gn refers to the bone point data in the second reference body model, $\beta$ represents the compensation coefficient, f ( ) refers to a function relationship of variables Gm, Gn, $\beta$ and Gp.

With the function relationship as proportional relationship, i.e. linear interpolation, the body model processing system obtains the bone point data of the target body model in the following formula:

$$Gp = Gm*\beta + Gn*(1-\beta). \tag{7}$$

In the formula (7), Gm represents the first bone point data in the first reference body model, Gn represents the second bone point data in the second reference body model, Gp represents the bone point data of the target body model, and $\beta$ represents the compensation coefficient.

Still with the model parameter as body weight, with reference to FIG. 5, FIG. 5A shows the first bone point data with a distance of Xm from the surrounding box, FIG. 5C shows the second bone point data with a distance Xn from the surrounding box, FIG. 5B shows the bone point data of the target body model, with a distance Xp from the surrounding box, where in this case, Xp=Xm*$\beta$+Xn*(1-$\beta$). In other words, along with change of the body weight, the distance of the bone point from the surrounding box also changes. Since the surrounding box is the skin of the body model, the bone point and the skin point change in position at a same proportion (the compensation coefficient), so as to achieve the effect that the bone point and the skin point are matched.

It is to be noted that in this embodiment, in addition to the linear interpolation, polynomial relationship, quadratic interpolation, Lagrange polynomial interpolation or the like may be used to obtain the bone point data so as to obtain the target body model, and the corresponding solution also falls within the scope of protection of the present disclosure.

It is to be noted that in this embodiment, the typical body models corresponding to the first value, the second value and the third value are obtained and two of the typical body models are used as reference body models to generate the target body model, which helps obtain the target body model quickly. If only one typical body model is selected, it is required to perform re-computation processing and rendering processing on the typical body model. If two typical body models are selected, it is only required to perform addition and multiplication, leading to faster speed and thus it is applicable to use scenario with high real-timeness requirement. If a plurality of typical body models are selected, the storage space for storing the typical body models and the computation amount will be increased, and thus it is not applicable to use scenario with high real-timeness requirement.

In another embodiment, the body model processing system may process the skin points in the typical body models in the same manner as the bone points. By referring to the embodiment in which the bone points are processed, after the first reference body model and the second reference body model are determined, the body model processing system may sequentially obtain first skin point data in the first reference body model and obtain second skin point data in the second reference body model at the same position as in the first reference body model. Then, based on the compensation coefficient, the first skin point data and the second skin point data, skin point data in the target body model at the same position as in the first reference body model is determined in the following calculation formula:

$$Mp = Mm * \beta + Mn * (1 - \beta). \qquad (8)$$

In the formula (8), Mm refers to the first skin point data in the first reference body model, Mn refers to the second skin point data in the second reference body model, Mp refers to the skin point data in the target body model, and β refers to the compensation coefficient.

At step 13, the target body model corresponding to the model parameter is displayed.

In this embodiment, after the bone point data and the skin point data are obtained, the body model processing system may, based on coordinate data in the bone point data and the skin point data, place these points at the corresponding positions of a preset coordinate system. Since the first reference body model and the second reference body model have the same weight coefficient, their weight coefficient can be directly assigned to the target body model. The weight coefficient is used to represent the degree of influence of the bone point on each skin point, that is, the closer the bone point is to the skin point, the larger the weight coefficient between the bone point and the skin point is, and the larger the influence of the bone point on the skin point is. The body model processing system may validate the weight coefficient between the bone point and the skin point so as to obtain the target body model. In other words, after the position of the bone point changes, it can exert influence on a related skin point to change the position of the skin point.

In this embodiment, the typical body models are processed to obtain the target body model, such that the positions of the bone points and the skin points in the target body model change in display effect at a same proportion (same compensation coefficient), helping improve the display effect in subsequent dynamic display and enhance the user experiences.

On the basis of the body model processing method provided by the embodiments of the present disclosure, an embodiment of the present disclosure further provides a body model processing apparatus, which is applied to perform the method of FIGS. 1 to 5. As shown in FIG. 6, the apparatus includes: a configuration window displaying module 61, configured to, in response to detecting a trigger operation for a body model displayed currently, display a parameter configuration window; where the parameter configuration window includes an image component relating to at least one model parameter of the body model; a body model obtaining module 62, configured to, in response to detecting a trigger operation for at least one image component, determine a model parameter corresponding to the at least one image component and obtain a target body model corresponding to the model parameter; a target model displaying module 63, configured to display the target body model corresponding to the model parameter.

It is noted that the apparatus in the present embodiment matches the contents of the method embodiments and thus can be referred to the contents of the above method embodiments and will not be repeated herein.

On the basis of the body model processing method provided by the embodiments of the present disclosure, an embodiment of the present disclosure further provides a body model processing system. As shown in FIG. 7, the system includes: an inputting unit 71, configured to receive a target value of a model parameter input by a user; a storing unit 72, configured to store processor-executable computer programs; a processor 73, electrically connected with the inputting unit to perform the method of FIGS. 1 to 5 by executing the computer programs in the storing unit and generate a target body model corresponding to the model parameter; and a displaying unit 74, electrically connected with the processor to display the target body model.

In an embodiment, the processor is configured to obtain the target body model corresponding to the model parameter, which includes: obtaining a target value of the model parameter input by the user; obtaining typical body models corresponding to a typical value of the model parameter; based on the target value, processing the typical body models to obtain the target body model corresponding to the model parameter.

In an embodiment, the processor is configured to obtain the typical body models corresponding to the typical value of the model parameter, which includes: obtaining the typical value of the model parameter; where the typical value includes a first value, a second value and a third value, and the first value, the second value and the third value decrease sequentially; obtaining body models corresponding to the first value, the second value and the third value respectively, so as to obtain the typical body models.

In an embodiment, the processor is configured to process the typical body models based on the target value, which includes: based on the target value, processing bone point data in the typical body models to obtain bone point data of the target body model.

In an embodiment, the processor is configured to process the typical body models based on the target value, which includes: based on a preset bone point hierarchical sequence and the target value, processing the bone point data in the typical body models to obtain the bone point data of the target body model.

In an embodiment, the processor is configured to process the bone point data in the typical body models, which includes: obtaining a correspondence between the target value and the typical value; based on the target value, the correspondence and the typical value, determining a compensation coefficient; based on the correspondence, selecting two models from the typical body models to obtain a first reference body model and a second reference body model; based on the compensation coefficient, the bone point data in the first reference body model and the bone point data in the second reference body model, obtaining the bone point data of the target body model.

In an embodiment, the processor is configured to, based on the compensation coefficient, the bone point data in the first reference body model and the bone point data in the second reference body model, obtain the bone point data of the target body model, which includes: sequentially obtaining first bone point data in the first reference body model and obtaining second bone point data in the second reference body model at the same position as a first bone point; based on the compensation coefficient, the first bone point data and the second bone point data, performing interpolation to obtain newly-interpolated bone point data and taking the newly-interpolated bone point data as bone point data in the target body model at the same position as the first bone point.

In an embodiment, the bone point data of the target body model is calculated in the following formula:

$$Gp = Gm * \beta + Gn * (1 - \beta).$$

where Gp represents the newly-interpolated bone point data, Gm represents the first bone point data, Gn represents the second bone point data, and β represents the compensation coefficient.

In an embodiment, the processor is configured to process the typical body models based on the target value, which further includes: based on the target value, processing skin points in the typical body models; where the skin points are processed in the same manner as the bone points.

It is noted that the system shown in the present embodiment is matched in contents with the method embodiment and can be referred to the contents of the method embodiments and will not be repeated herein.

In an embodiment, an embodiment of the present disclosure further provides a computer readable storage medium, where executable computer programs in the storage medium are executed by a processor to perform the method of FIGS. 1 to 5.

The above embodiments may be implemented wholly or partially by software, hardware, firmware or any combination thereof. When software is employed, the embodiments may be implemented partially or wholly in the form of computer program product. The computer program product includes one or more computer instructions. The computer instructions are loaded and executed on a computer, the flows or functions according to the embodiments of the present disclosure are generated partially or wholly. The computer may be a general computer, a dedicated computer, a computer network, or other programmable apparatus. The computer instructions may be stored in the computer readable storage medium. The computer readable storage medium may be any available medium accessible by a computer or a data storage device such as a server and a data center including one or more available mediums. The available medium may be magnetic medium (for example, floppy disk, harddisk and magnetic tape), optical medium (for example, Digital Video Disc (DVD)), or semiconductor medium (for example, Solid State Disk (SSD)) or the like.

Some embodiments of the present disclosure provide a computer readable storage medium (e.g. non-transitory computer readable storage medium). The computer readable storage medium stores computer program instructions which are run by a processor to cause a computer to perform the body model processing method of any one of the above embodiments, for example, one or more steps of the above body model processing method.

Illustratively, the above computer readable storage medium may include but not limited to: a magnetic storage device (e.g. hard disk, floppy disk, or magnetic tape or the like), a compact disk (e.g. Compact Disk (CD)), a Digital Versatile Disk (DVD), a smart card and a flash memory (e.g. Erasable Programmable Read-Only Memory (EPROM), or a card, rod or key driver or the like). The various computer readable storage mediums described in the present disclosure can represent one or more devices and/or other machine readable storage mediums for storing information. The term "machine readable storage medium" includes but not limited to: wireless channel and various other mediums capable of storing, containing and/or carrying instructions and/or data.

The processor in the embodiments of the present disclosure may be a central processing unit (CPU), a general-purpose processor, a digital signal processor (DSP), an Application Specific Integrated Circuit (ASIC), a Field-Programmable Gate Array (FPGA), or another programmable logic device, transistor logic device, hardware component or any combination thereof, which can implement or perform various illustrative logic blocks and modules described in combination with the contents of the present disclosure. The processor may also be a combination for realizing a computing function, for example, a combination of one or more microprocessors, or a combination of DSP and microprocessor or the like.

Furthermore, the memory in the embodiments of the present disclosure may be a Random Access Memory (RAM), a flash memory, a Read Only Memory (ROM), an Erasable Programmable ROM (EPROM), an Electrically EPROM (EEPROM), a register, a hard disk drive, a removable hard disk drive, CD-ROM or any other type of storage mediums well known in the prior arts.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and embodiments are considered as exemplary only, with a true scope and spirit of the present disclosure being indicated by the following claims. It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A body model processing method, comprising:

in response to detecting a trigger operation for a body model displayed currently, displaying a parameter configuration window; wherein the parameter configuration window comprises an image component relating to at least one model parameter of the body model;

in response to detecting a trigger operation for at least one image component, determining a model parameter corresponding to the at least one image component;

obtaining a target body model corresponding to the model parameter; and displaying the target body model corresponding to the model parameter;

wherein obtaining the target body model corresponding to the model parameter comprises:

obtaining a target value of the model parameter;

obtaining a first value, a second value and a third value of the model parameter, wherein the first value, the second value and the third value decrease sequentially, the first value is any one value in a first preset range of the model parameter, the second value is any one value in a second preset range of the model parameter, the third value is any one value in a third preset range of the model parameter, values in the first preset range are greater than values in the second preset range, and the values in the second preset range are greater than values in the third preset range;

obtaining first body models by acquiring body models corresponding to the first value, the second value and the third value respectively; and based on the target value, processing the first body models to obtain the target body model corresponding to the model parameter;

wherein, based on the target value, processing the first body models comprises:

based on a preset bone point hierarchical sequence and the target value, processing bone point data in the first body models to obtain bone point data of the target body model, wherein the preset bone point hierarchical sequence indicates an order from a root node to a leave node or from a leave node to a root node of a tree structure presented by bone joints;

wherein processing the bone point data in the first body models comprises:

obtaining a correspondence between the target value and the first value, the second value and the third value;

based on the target value, the correspondence and two of the first value, the second value and the third value, determining a compensation coefficient;

based on the correspondence, selecting two models from the first body models to obtain a first reference body model and a second reference body model; and according to the preset bone point hierarchical sequence, based on the compensation coefficient, bone point data in the first reference body model and bone point data in the second reference body model, obtaining the bone point data of the target body model.

2. The method of claim 1, wherein, based on the target value, processing the first body models comprises:

based on the target value, processing bone point data in the first body models to obtain bone point data of the target body model.

3. The method of claim 1, wherein, based on the compensation coefficient, the bone point data in the first reference body model and the bone point data in the second reference body model, obtaining the bone point data of the target body model comprises:

sequentially obtaining first bone point data in the first reference body model and obtaining second bone point data in the second reference body model at a same position as a first bone point; and based on the compensation coefficient, the first bone point data and the second bone point data, performing interpolation to obtain newly-interpolated bone point data and taking the newly-interpolated bone point data as bone point data in the target body model at a same position as the first bone point.

4. The method of claim 3, wherein the bone point data of the target body model is calculated in a following formula:

$$Gp = Gm * \beta + Gn * (1 - \beta);$$

wherein Gp represents the newly-interpolated bone point data, Gm represents the first bone point data, Gn represents the second bone point data, and β represents the compensation coefficient.

5. The method of claim 1, wherein, based on the target value, processing the first body models further comprises:

based on the target value, processing skin points in the first body models;

wherein the skin points are processed in a same manner as bone points.

6. A body model processing system, comprising:

an inputting unit, configured to receive a target value of a model parameter input by a user;

a processor, electrically connected with the inputting unit to generate a target body model corresponding to the model parameter by the method of claim 1;

a displaying unit, electrically connected with the processor to display the target body model.

7. A non-transitory computer readable storage medium, wherein computer programs in the storage medium are executed by a processor to perform the method of claim 1.

\* \* \* \* \*